United States Patent
Jajoo et al.

(10) Patent No.: US 9,301,094 B2
(45) Date of Patent: Mar. 29, 2016

(54) METHODS, SYSTEMS AND COMPUTER-READABLE MEDIA FOR TRACKING A POSITION OF AN OBJECT

(71) Applicant: Infosys Limited, Bangalore (IN)

(72) Inventors: Manoj Vijaykumar Jajoo, Hyderabad (IN); Pavan Kumar Kulkarni, Hyderabad (IN); Archana Sachin Ghag, Pune (IN); Noor Mohammed, Hyderabad (IN); Chandrasekhar Subrahmanya Darbha, Visakhapatnam (IN)

(73) Assignee: Infosys Limited, Bangalore (IN)

( * ) Notice: Subject to any disclaimer, the term of this patent is extended or adjusted under 35 U.S.C. 154(b) by 46 days.

(21) Appl. No.: 14/220,104

(22) Filed: Mar. 19, 2014

(65) Prior Publication Data

US 2014/0378165 A1 Dec. 25, 2014

(30) Foreign Application Priority Data

Jun. 24, 2013 (IN) .......................... 2732/CHE/2013

(51) Int. Cl.
  *H04W 4/02* (2009.01)
  *H04W 64/00* (2009.01)
(52) U.S. Cl.
  CPC ............... *H04W 4/021* (2013.01); *H04W 4/02* (2013.01); *H04W 4/025* (2013.01); *H04W 64/00* (2013.01)
(58) Field of Classification Search
  None
  See application file for complete search history.

(56) References Cited

U.S. PATENT DOCUMENTS

| 8,174,931 B2 | 5/2012 | Vartanian et al. | |
| 2006/0270421 A1* | 11/2006 | Phillips | G08B 21/0236 455/457 |
| 2008/0042898 A1* | 2/2008 | Sharma | G01S 5/0284 342/450 |

OTHER PUBLICATIONS

Ausmeier, "InNAVation: Indoor Navigation Using Mobile Phones," http://people.cs.uct.ac.za/6B0C1BC-0AEE-4776-AAA5-A668221A163A/Fi, 2012 African Conference for Software Engineering and Applied Computing, 2012, 7 pages.
Jekabsons, "An Analysis of Wi-Fi Based Indoor Positioning Accuracy," https://ortus.rtu.lv/science/lv/publications/12372/fulltext, *Scientific Journal of Riga Technical University*, vol. 47, 2011, 7 pages.
http://appamundi.com/projects/indoor-navigation/, Copyright © 2013 APPA Mundi Limited, 3 pages.
Puikkonen, "Improving the UI Design of Indoor Navigation Maps," http://www.acm.org/uist/archive/adjunct/2009/pdf/posters/paper164.pdf, 2009, 2 pages.

(Continued)

*Primary Examiner* — Charles Appiah
*Assistant Examiner* — Margaret G Mastrodonato
(74) *Attorney, Agent, or Firm* — Klarquist Sparkman, LLP (57) ABSTRACT

Embodiments provide a method and system for tracking a position of an object. The method may include creating a plurality of geofences on a map of a predefined location and identifying, by Wi-Fi trilateration, the position of the object within the created geofence. Further, a floor layout of the predefined location may be created by a handheld device. The position of the object can be represented on the created floor layout.

26 Claims, 9 Drawing Sheets

(56) References Cited

OTHER PUBLICATIONS

Bahl, "User Location and Tracking in an In-Building Radio Network," http://research.microsoft.com/enus/um/people/padmanab/papers/ms, Feb. 1999, 13 pages.

Candy, "A Mobile Indoor Location-Based GIS Application," http://www.isprs.org/proceedings/XXXVI/5-C55/papers/candy_jonathan.pdf, 2007, 6 pages.

* cited by examiner

METHODS, SYSTEMS AND COMPUTER-READABLE MEDIA FOR TRACKING A POSITION OF AN OBJECT

FIELD

The field relates generally to a method and system for location tracking. More specifically, the field relates to a method and system for tracking a location of an object by Wi-Fi trilateration.

BACKGROUND

Tracking a position of an object in a predefined location lacks the required accuracy while employing existing technologies. For instance, global positioning system (GPS) technology fails in determining the position of the object inside a solid structure such as a building, with an accuracy of three to five meters. Additionally, current location tracking technologies merely provide a set of location co-ordinates of the object. The set of location co-ordinates may lack sufficient information in representing the position of an object in terms of proximity of the object to a pre-designated location within the predefined location.

Further, for the purpose of servicing location-based services in a predefined location, existing tools require a user to draw a floor layout of the predefined location with a set of drawing tools. Such an approach is a cumbersome process and tends to be faulty in the event the user fails to represent a pre-designated location on the floor layout. There is a need for a method and a system that can automatically draw the floor layout on a handheld device, as the user traverses the predefined location.

Hence, there is a need for a method and a system that can track the position of the object in a predefined location with an accuracy level of two to five meters. The alternate method and system must enable representing the position of the object on the floor layout of the predefined location, in terms of proximity of the object to a pre designated location of the predefined location. Thus a method and a system for tracking the position of the object on the floor layout are proposed.

SUMMARY

The present invention provides a method for tracking a position of an object. In accordance with a disclosed embodiment, the method may include creating a plurality of geofences on a map of a predefined location and identifying, by Wi-Fi trilateration, the position of the object within the created geofence. Further a floor layout of the predefined location may be created by a handheld device and the position of the object can be represented on the created floor layout.

In an additional embodiment, a system tracking a position of an object is disclosed. The system comprises a drawing pad configured to create a plurality of geofences on a map of a predefined location. The system further includes a tracking module configured to identify a position of the object, by Wi-Fi trilateration, within the created geofence. Further, a floor map generator shall be configured to create a floor layout of the predefined location; and a display module can be configured to represent the position of the object on the created floor layout.

These and other features, aspects, and advantages of the present invention will be better understood with reference to the following description and claims.

While systems and methods are described herein by way of example and embodiments, those skilled in the art recognize that systems and methods for electronic financial transfers are not limited to the embodiments or drawings described. It should be understood that the drawings and description are not intended to be limiting to the particular form disclosed. Rather, the intention is to cover all modifications, equivalents and alternatives falling within the spirit and scope of the appended claims. Any headings used herein are for organizational purposes only and are not meant to limit the scope of the description or the claims. As used herein, the word "may" is used in a permissive sense (i.e., meaning having the potential to) rather than the mandatory sense (i.e., meaning must). Similarly, the words "include", "including", and "includes" mean including, but not limited to.

DETAILED DESCRIPTION

Disclosed embodiments provide computer-implemented methods, systems, and computer-program products for tracking a position of an object in a predefined location. The predefined location maybe an indoor location or an outdoor location. Further, automatic creation of a customized floor layout of the predefined location depicting a plurality of elements within the predefined location can improve the tracking experience in location determining systems. The disclosed methods and systems provide techniques for creation of such customized floor layouts and thereby representing the position of the object on the customized floor layouts.

Figure 1:
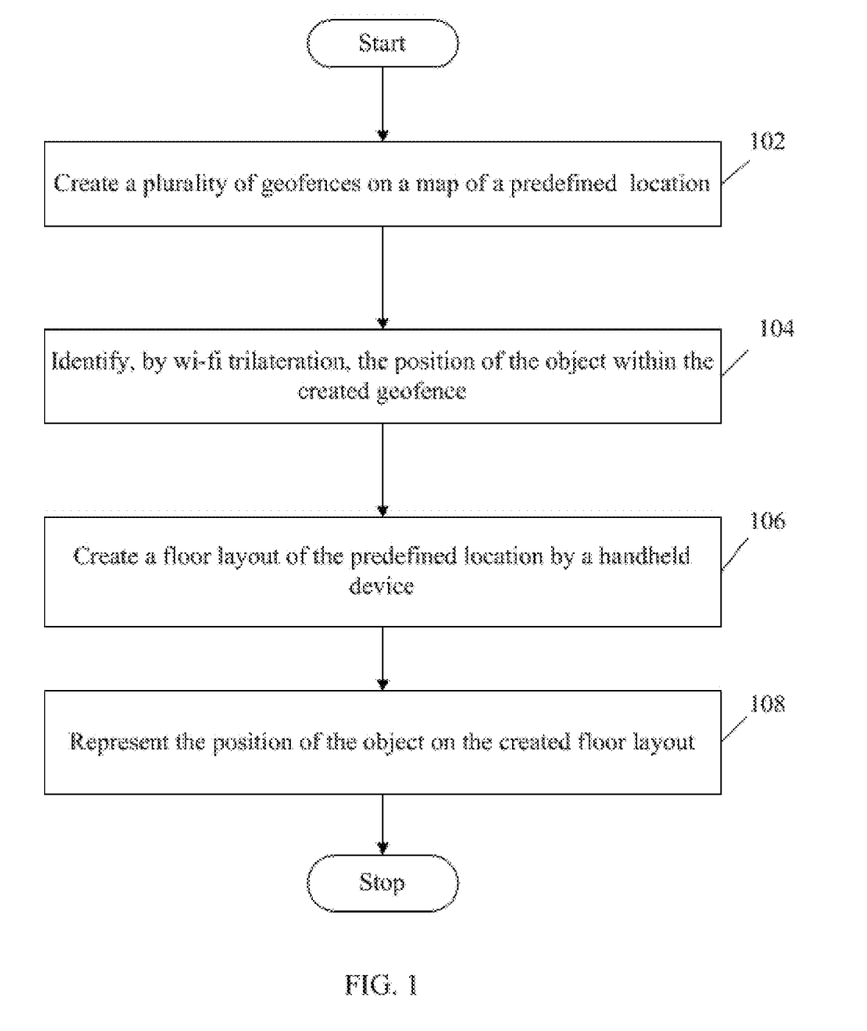
FIG. 1 is a flowchart illustrating an embodiment of a method for tracking a position of an object.

FIG. 1 illustrates an embodiment of a method of practicing the present invention. At step 102, a plurality of geo-fences may be created on a map of the predefined location. The map maybe a digitized visual layout of the predefined location accessible from a computer enabled device. A user involved in creation of the geofences may draw the geofence on the digitized visual layout via an input interface module. The created geo-fences may be in the shape of a circle, line or a polygon. Further, a point of interest may be associated with each created geo-fence. At step 104, a position of the object within the created geo-fence can be identified by Wi-Fi trilateration method. At step 106, a floor layout of the predefined location can be created using a handheld device, where a plurality of positions of the predefined location is fetched by the handheld device. The plurality of positions of the predefined location maybe tagged as per the functionality of each position, by the user via the input interface module. The position of the object maybe represented on the created floor layout at step 108.

Figure 2:
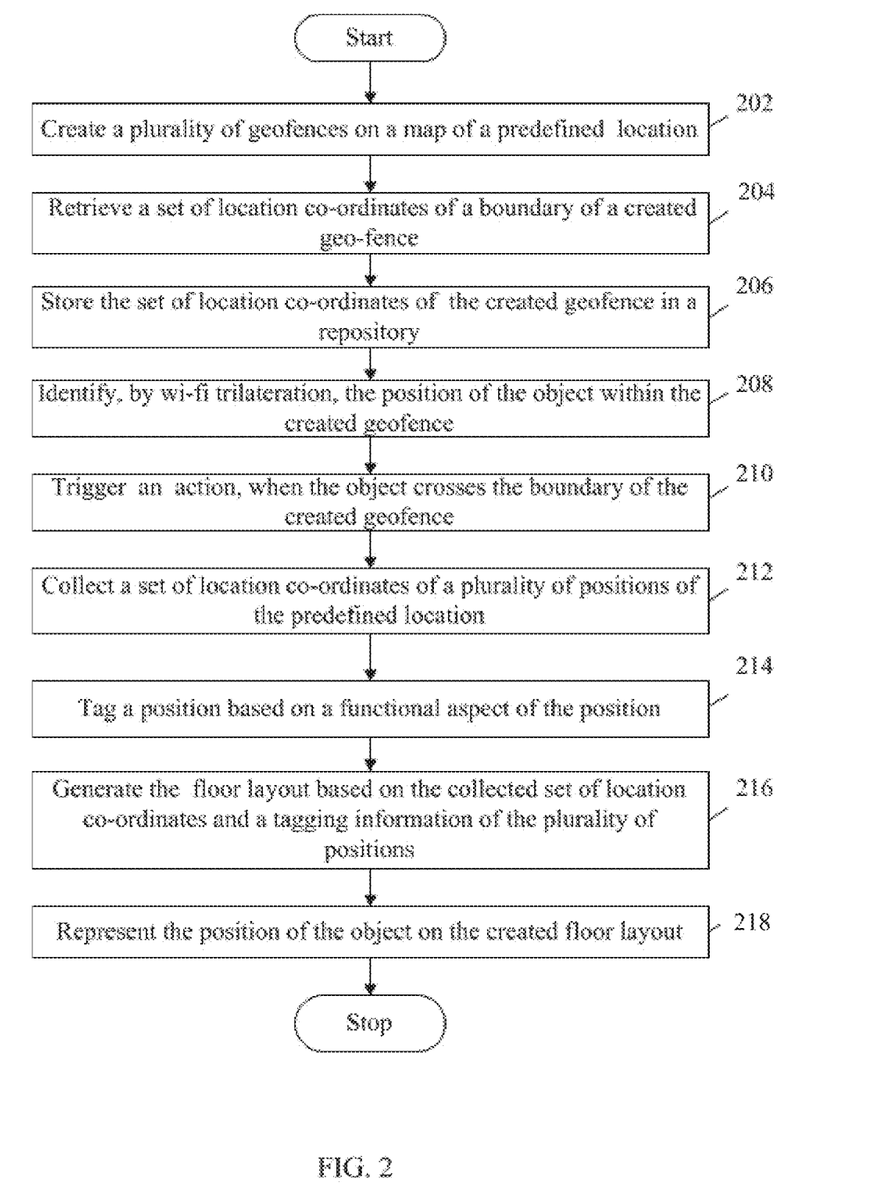
FIG. 2 is a flowchart illustrating an alternate embodiment of a method for tracking a position of an object.

FIG. 2 illustrates an alternate embodiment of a method of practicing the present invention. At step 202, a plurality of geofences can be created on a map of a predefined location. Further, at step 204, a set of location co-ordinates of the created geo-fence maybe retrieved by an interface module, and stored in a repository subsequently at step 206. A user involved in creation of the geofences may draw the geofence on the digitized visual layout via an input interface module. The created geo-fences may be in the shape of a circle, a line or a polygon. Further, a point of interest may be associated with each created geo-fence. Further, at step 208, the position of the object maybe identified by a method of Wi-Fi trilateration, within the created geofence. The method of Wi-Fi trilateration includes selecting the position of the object as a best location from a plurality of locations, whereby the plurality of locations is determined by a plurality of mathematical models. The plurality of mathematical models may include a polygon centroid method, a polygon triangle centroid method, and an expanding circles method. As the object traverses within the predefined location, knowledge of the position of the object may be tracked via preset triggers associated with the created geofences. For instance, a trigger maybe associated with a geofence such as a conference room of a predefined location such as an office building. The associated trigger can be of raising an alarm, when the object crosses a boundary of the conference room. Thus the user may be notified, of the exit of the object from the given conference room. Further, triggers can involve any other action such as transferring data downstream to an application. Hence at step 210, an action can be triggered when the object crosses the boundary of the created geofence.

Step 212, involves creation of a floor layout in a detailed manner, of the predefined location. A set of location co-ordinates of a plurality of positions of the predefined location can be collected via a handheld device, as the handheld device is made of traverse throughout the predefined locations. A location co-ordinate of a position usually includes a latitude, a longitude and an altitude of the position. At step 214, the user of the handheld device, may tag each position based on a functional aspect of the position. For instance, a location co-ordinate of the conference room on a first floor of the building maybe tagged as "first floor conference room". The set of location co-ordinates and a tag information of the plurality of positions of the predefined location may be sent to a server, and stored in the repository. At step 216, the stored set of location co-ordinates and the tag information maybe be utilized for generating the floor layout. Further the position of the object maybe represented on the created floor layout at step 218. The representation of the position of the object on the created floor layout may include, depicting proximity of the object to a tagged position of the generated floor layout. For instance, if the object is located at a location co-ordinate, as identified by the Wi-Fi trilateration method, of (10,20,30) which is at a proximity distance from the conference room whose location co-ordinate is (12, 22, 32), then the representation of the position of the object can be as; the object is location a proximity of the conference room. Such a representation shall aid the user in locating the object more effectively.

Additionally, the position of the object as identified may be stored in the repository on a periodic basis, such that the movement of the object maybe tracked. From the repository, a last point of interest of the object maybe retrieved and based on a past history of the object, a next point of interest the object may traverse to can be suggested.

Figure 3A:
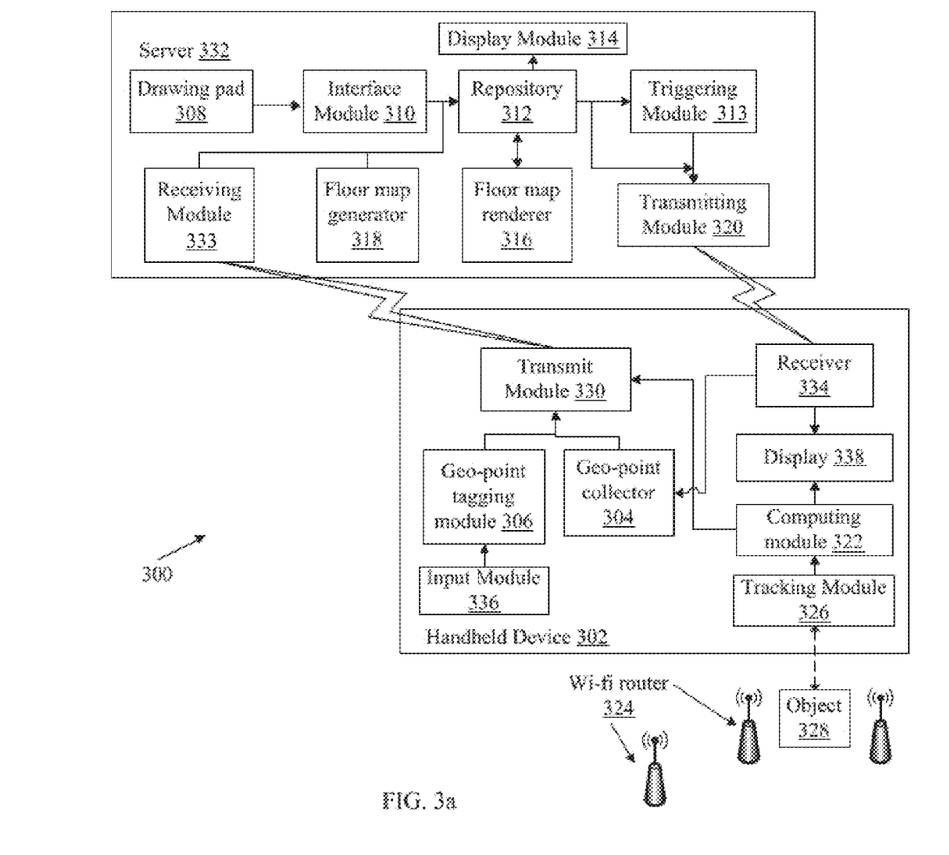
FIG. 3a shows an exemplary system for tracking a position of an object.

FIG. 3a illustrates an exemplary system 300 in which various embodiments of the invention can be practiced. The exemplary system 300 includes a server 332, and a handheld device 302 which can be in wireless communication with the server 332. The server 332, includes a drawing pad 308, an interface module 310, a repository 312, a triggering module 313, a receiving module 333, a floor map generator 318, a floor map renderer 316, a transmitting module 320, and a display module 314. The handheld device 302, includes an input module 336, geo-point tagging module 306, a transmit module 330, a receiver 334, a display 338, a computing module 322, and tracking module 326. The tracking module 326 shall include a set of Wi-Fi routers 324, spanning a predefined location.

In the server 332, the drawing pad 308, can be a layer on which a plurality of geofences may be drawn by a user on a digitized visual layout of a predefined location. The interface module 310, shall retrieve the location co-ordinates of the drawn geofences, so as to store the created geofences along with the location co-ordinates in the repository 312. The tracking module 326, shall identify a position of an object 328, where the object 328 maybe located within one of the created geofence, by a Wi-Fi trilateration method. By the disclosed Wi-Fi trilateration method, the position of the object 328, can be determined up to an accuracy of three meters from the actual position of the object 328, when the predefined location is an indoor environment. In another embodiment, a similar accuracy may be achieved when the predefined location is in an outdoor environment. The object 328 can be assumed to be associated with a electronic device capable of wireless communication with the set of Wi-Fi routers 324. The Wi-Fi trilateration includes selecting the position of the object as a best location from a plurality of locations, where the plurality of locations can be determined by a plurality of mathematical models, such as a polygon centroid method, a polygon triangle centroid method, and an expanding circles method. In each of the aforementioned method a distance of the object 328 from set of three Wi-Fi routers are essential in determining the position of the object. The set of three Wi-Fi routers are usually a subset of the set of Wi-Fi routers 324, such that the set of three Wi-Fi routers are closest to the object 328 at a given instant of time. The object 328 shall usually transmit a signal strength as received from each of the set of three Wi-Fi routers periodically to the tracking module 326. Based on the signal strength and techniques well known in prior art, the tracking module 326, can compute a distance r1, r2 and r3 of the object 328 from the Wi-Fi router 1, Wi-Fi router 2 and Wi-Fi router 3 respectively (ref FIG. 4). Further, a set of location co-ordinates C1, C2 and C3 of the Wi-Fi router 1, Wi-Fi router 2 and Wi-Fi router 3 respectively can be retrieved from the repository 312, into the computing module 322. The computing engine 322, shall utilize r1,r2, r3, C1,C2 and C3 in each of the three mathematical models as mentioned above, to determine a set of three location co-ordinates of the object 328. A best of the three location co-ordinates can be determined to be the position of the object 328, by the computing module 322.

Figure 4:
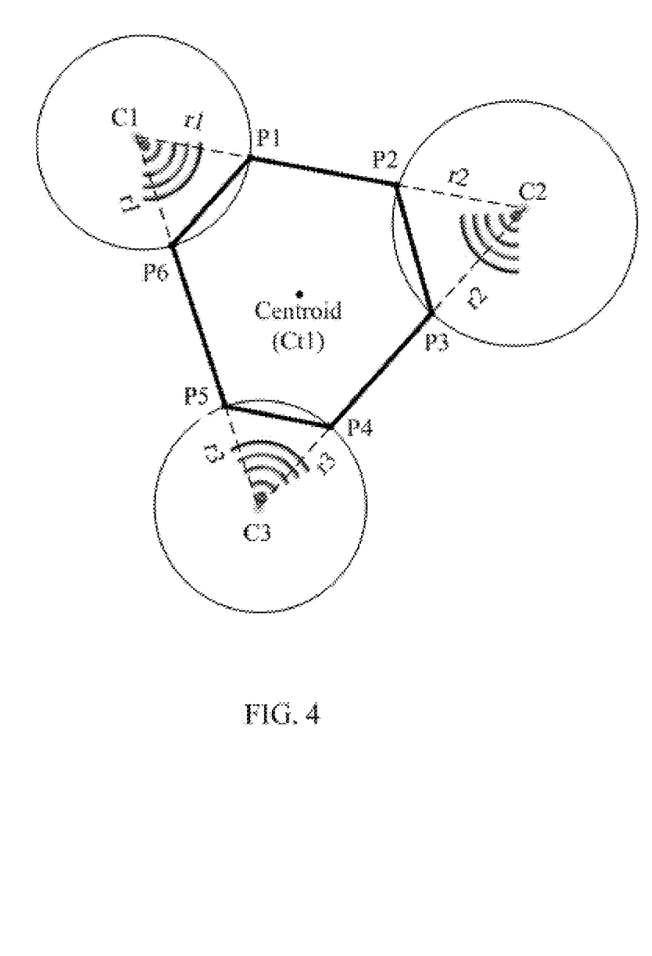
FIG. 4 shows a polygon centroid method for determining a location of an object

In the polygon centroid method as shown in FIG. 4, a distance of the object 328, from a set of three Wi-Fi routers, Wi-Fi router 1, Wi-Fi router 2, Wi-Fi router 3, each situated at center C1, C2, and C3 respectively, can be determined by the tracking module 326, based on a signal strength of the set of three Wi-Fi routers, as received by the electronic device associated with the object 328. The object 328 shall transmit the signal strength as received from the set of three Wi-Fi routers periodically to the tracking module 326. Based on the signal strength and techniques well known in prior art, the tracking module 326, can compute a distance r1, r2 and r3 of the object 328 from the Wi-Fi router 1, Wi-Fi router 2 and Wi-Fi router 3 respectively. A location co-ordinate of the Wi-Fi router 1, denoted as C1 in FIG. 4, can be retrieved from the repository 312, by the computing engine 322. Similarly location co-ordinate C2, and C3, of Wi-Fi router 2 and Wi-Fi router 3 respectively may be retrieved by the computing engine 322.

The computing module 322 shall be configured to determine the position of the object 328, by drawing three circles with centers C1, C2, and C3 and radii r1, r2 and r3 respectively. Each of the centers C1, C2 and C3 are joined by line segments C1C2, C2C3, and C3C1 respectively such that line segment C1C2 intersects circle C1 at point P1, and C2 at point P2. Similarly line segment C2C3 intersects circle C2 at point P3 and circle C3 at point P4, and line segment C3C1 intersects circle C3 at point P5 and circle C1 at point P6. Points P1, P2, P3, P4, P5, and P6 are joined to form a hexagon P1P2P3P4P5P6. A centroid Ct1, of the hexagon P1P2P3P4P5P6, can be considered to be a first location of the object 328.

Figure 5:
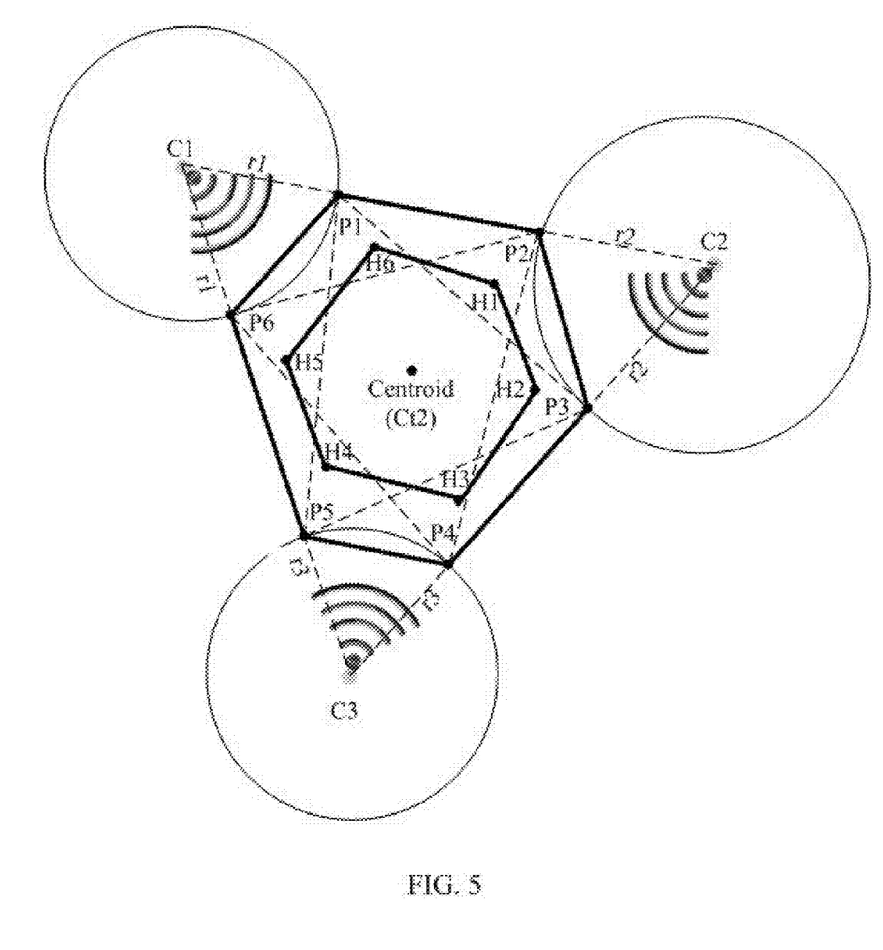
FIG. 5 shows a polygon triangle centroid method for determining a location of an object

As per the polygon triangle centroid method as illustrated in FIG. 5, the computing engine 322, shall follow similar steps as in the polygon centroid method to form the hexagon P1P2P3P4P5P6. Further point P1 and point P3 are joined to form a triangle P1P2P3. A centroid of the triangle P1P2P3 can be referred as H1. Similarly, point P2 and point P4 can be joined to form a triangle P2P3P4, and a centroid of the triangle P2P3P4 can be illustrated as H2. Point P3 and point P5 are joined to form a triangle P3P4P5, whose centroid can be illustrated as H3. Point P4 and P6 are joined to form a triangle P4P5P6, whose centroid can be illustrated as H4, and point P5 and P1 are joined to form a triangle P5P6P1, and a centroid of the triangle P5P6P1 can be illustrated as H6. Points H1, H2, H3, H4, H5, and H6 can be joined to form an inner hexagon H1H2H3H4H5H6, and a centroid Ct2 of the inner hexagon, shall be determined as a second location of the object 328.

Figure 6A:
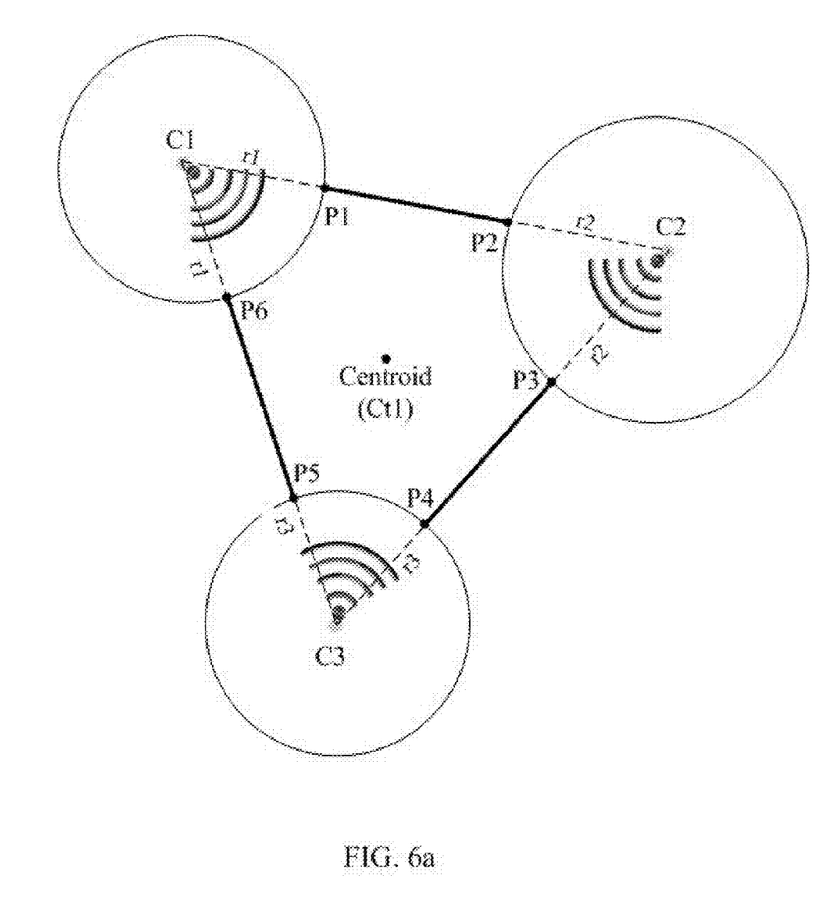
FIGS. 6a and 6b shows an expanding circles method for determining a location of an object
Figure 6B:
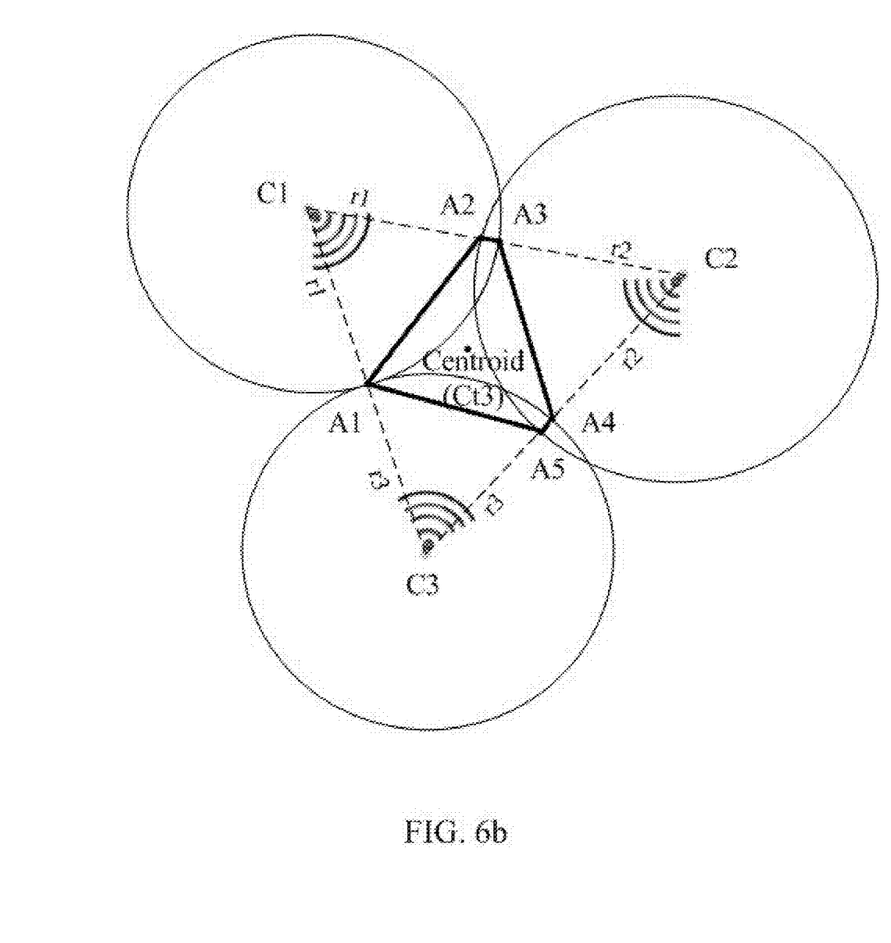

According to the expanding circles method, as illustrated in FIGS. 6a and 6b, the computing engine 322, shall form a triangle C1C2C3 by joining the centers C1, C2 and C3, where C1, C2 and C3 are location co-ordinates of Wi-Fi router 1, Wi-Fi router 2 and Wi-Fi router 3 respectively. Further, using radii r1, r2 and r3, and centers as C1, C2 and C3, respectively, three circles maybe drawn, where the radii r1,r2 and r3 are tracked by the tracking module, as a distance of the object 328, from the Wi-Fi router 1, the Wi-Fi router 2 and the Wi-Fi router 3 respectively. As shown in FIG. 6a, line segment C1C2 intersects circle C1 at point P1 and circle C2 at point P2, line segment C2C3 intersects circle C2 at point P3 and circle C3 at point P4, and line segment C3C1 intersects circle C3 at point P5 and circle C1 at point P6. Points P1, and P2 are joined, points P3 and P4 are joined and points P5 and P6 are joined. A longest line segment amongst P1P2, P3P4 and P5P6 shall be determined as a distance d2. A distance d2/2 shall be added to the radii r1, r2 and r3 to redraw circles with center C1, C2 and C3 are illustrated in FIG. 6b. C1 and C2 can be joined to intersect the circle C1 at A3 and the circle C2 and A2. Further, C2 and C3 can be joined such that line segment C2C3 intersects circle C2 at point A5 and circle C3 at point A4, and C3 and C1 are joined, such that line segment C3C1 intersects circle C3 and circle C1 at point A1. Points A1, A2, A3, A4, and A5 can be joined to form a pentagon A1A2A3A4A5. A centroid of the pentagon A1A2A3A4A5 shall be determined to be the third location of the object 328. The position of the object 328, is determined as a best location from the first location Ct1, the second location Ct2 and the third location Ct3. The best location maybe determined by considering a minimum of a sum of distances of each of Ct1, Ct2 and Ct3 from each of the routers.

In order to represent the position of the object 328, in a meaningful manner to a user, creation of a floor layout of the predefined location is needed. The floor map generator 318, shall create the floor layout of the predefined location, based on an input received from the geo-point collector 304, and the geo-point tagging module 306, of the handheld device 302.

As the handheld device 302, traverses along the predefined location, the geo-point collector 304, shall collect a set of location co-ordinates of a plurality of locations traversed by the handheld device 302. For each location, the geo-point tagging module 306, shall place a tag on the location, based on an input received from the user, through the input module 336. The input module 336, can be an input interface, or device, such as a touch screen, a keypad, and the like. The set of location co-ordinates and tagging information of each of the location shall be transmitted by a wireless communication link from the transmitter 330, to the server 332. The receiving module 333, at the server 332, shall receive the set of location co-ordinates and the tagging information, and store the set of location co-ordinates and the tagging information in the repository 312. The floor map renderer 316, shall access the set of location co-ordinates and the tagging information, also referred to as a metadata of the floor layout, and converts the metadata into a visual format of the floor layout. The visual format shall be stored in the repository 312, for further referencing purpose. The visual format shall be displayed on the display module of the 314, of the server, so that the user may visualize the floor layout of the predefined location. Further, the visual layout may be transmitted by the transmitting module 320, to the handheld device 302. The receiver 334, on the handheld device 302, shall receive the visual format of the floor layout and display the visual format on the display 338. Further the display module 314 can represent the position of the object 328, on the created floor layout by disclosing proximity of the object 328, to a tagged position of the created floor layout.

Figure 3B:
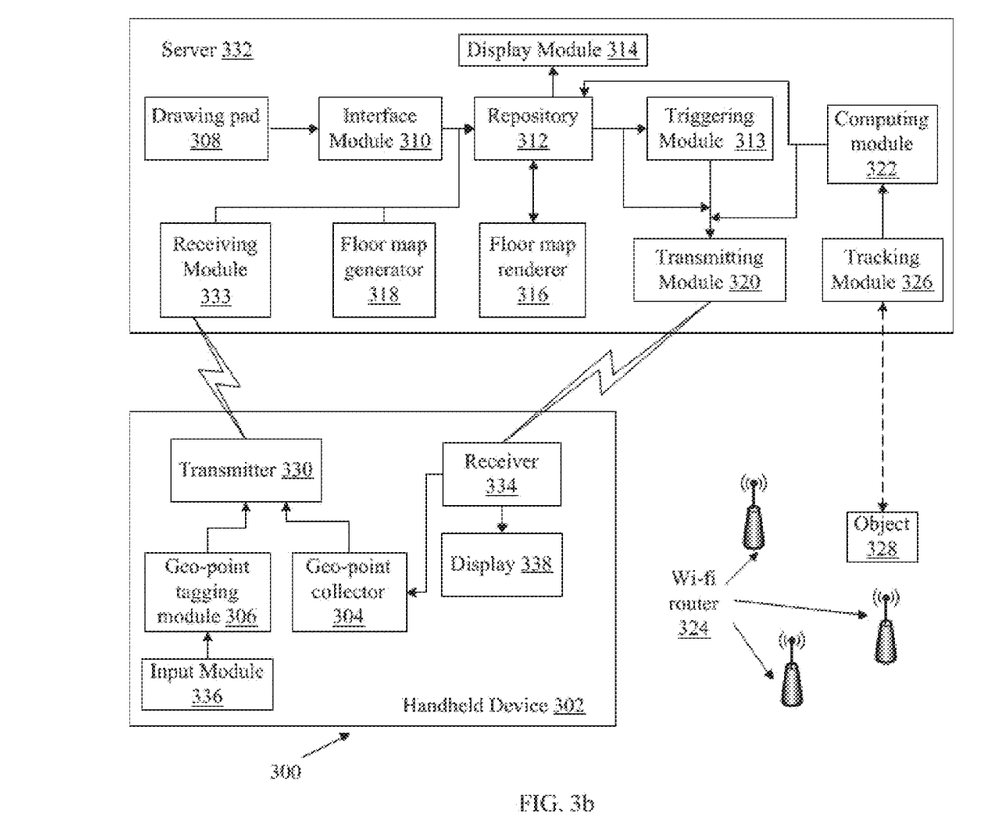
FIG. 3b shows an alternate exemplary system for tracking a position of an object.

In an alternate embodiment of the system, as shown in FIG. 3b, a tracking module 326, and a computing module 322, shall reside on a server 332. The alternate embodiment shall be useful in situation where a computing capacity of a handheld device 302, is low. Creation of a floor layout of a predefined location where an object 328, needs to be tracked and a determination of a position of the object 328, shall be processed on the server 332. The created floor layout and the tracked position of the object shall be communicated wirelessly to the handheld device 302.

Figure 7:
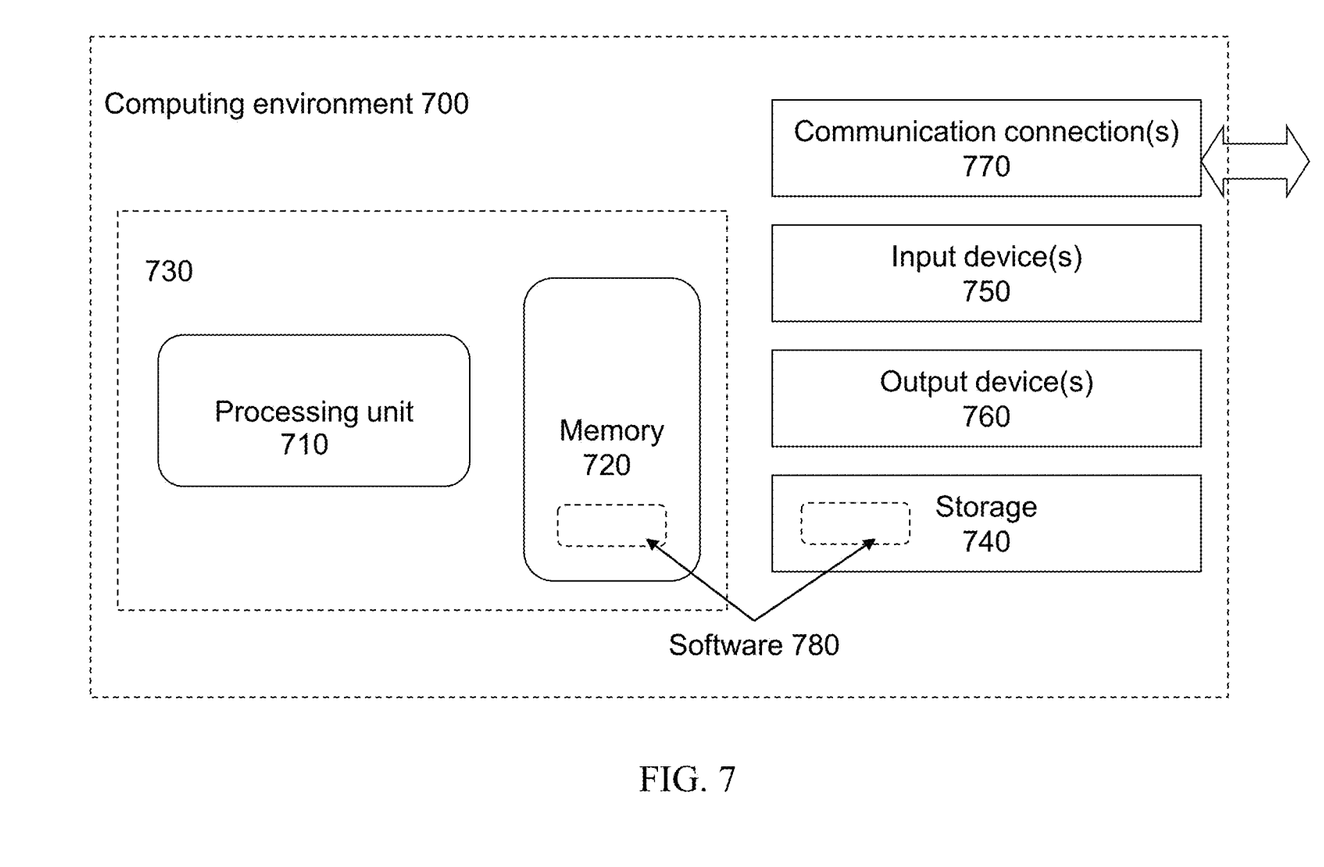
FIG. 7 illustrates a generalized example of a computing environment 700.

One or more of the above-described techniques can be implemented in or involve one or more computer systems. FIG. 7 illustrates a generalized example of a computing environment 700. The computing environment 700 is not intended to suggest any limitation as to scope of use or functionality of described embodiments.

With reference to FIG. 7, the computing environment 700 includes at least one processing unit 710 and memory 720. In FIG. 7, this most basic configuration 730 is included within a dashed line. The processing unit 710 executes computer-executable instructions and may be a real or a virtual processor. In a multi-processing system, multiple processing units execute computer-executable instructions to increase processing power. The memory 720 may be volatile memory (e.g., registers, cache, RAM), non-volatile memory (e.g., ROM, EEPROM, flash memory, etc.), or some combination of the two. In some embodiments, the memory 720 stores software 780 implementing described techniques.

A computing environment may have additional features. For example, the computing environment 700 includes storage 740, one or more input devices 750 one or more output devices 760, and one or more communication connections 770. An interconnection mechanism (not shown) such as a bus, controller, or network interconnects the components of the computing environment 700. Typically, operating system software (not shown) provides an operating environment for other software executing in the computing environment 700, and coordinates activities of the components of the computing environment 700.

The storage 740 may be removable or non-removable, and includes magnetic disks, magnetic tapes or cassettes, CD-ROMs, CD-RWs, DVDs, or any other medium which can be used to store information and which can be accessed within the computing environment 700. In some embodiments, the storage 740 stores instructions for the software 780.

The input device(s) 750 may be a touch input device such as a keyboard, mouse, pen, trackball, touch screen, or game controller, a voice input device, a scanning device, a digital camera, or another device that provides input to the computing environment 700. The output device(s) 760 may be a display, printer, speaker, or another device that provides output from the computing environment 700.

The communication connection(s) 770 enable communication over a communication medium to another computing entity. The communication medium conveys information such as computer-executable instructions, audio or video information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

Implementations can be described in the general context of computer-readable media. Computer-readable media are any available media that can be accessed within a computing environment. By way of example, and not limitation, within the computing environment 700, computer-readable media include memory 720, storage 740, communication media, and combinations of any of the above.

Having described and illustrated the principles of our invention with reference to described embodiments, it will be recognized that the described embodiments can be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein. Elements of the described embodiments shown in software may be implemented in hardware and vice versa.

As will be appreciated by those ordinary skilled in the art, the foregoing example, demonstrations, and method steps may be implemented by suitable code on a processor base system, such as general purpose or special purpose computer. It should also be noted that different implementations of the present technique may perform some or all the steps described herein in different orders or substantially concurrently, that is, in parallel. Furthermore, the functions may be implemented in a variety of programming languages. Such code, as will be appreciated by those of ordinary skilled in the art, may be stored or adapted for storage in one or more tangible machine readable media, such as on memory chips, local or remote hard disks, optical disks or other media, which may be accessed by a processor based system to execute the stored code. Note that the tangible media may comprise paper or another suitable medium upon which the instructions are printed. For instance, the instructions may be electronically captured via optical scanning of the paper or other medium, then compiled, interpreted or otherwise processed in a suitable manner if necessary, and then stored in a computer memory.

One or more computer-readable media (e.g., storage media) or one or more processor-readable media (e.g., storage media) can comprise computer-executable instructions causing a computing system (e.g., comprising one or more processors coupled to memory) (e.g., computing environment 700 or the like) to perform any of the methods described herein. Examples of such computer-readable or processor-readable media include magnetic media, optical media, and memory (e.g., volatile or non-volatile memory, including solid state drives or the like).

The following description is presented to enable a person of ordinary skill in the art to make and use the invention and is provided in the context of the requirement for a obtaining a patent. The present description is the best presently-contemplated method for carrying out the present invention. Various modifications to the preferred embodiment will be readily apparent to those skilled in the art and the generic principles of the present invention may be applied to other embodiments, and some features of the present invention may be used without the corresponding use of other features. Accordingly, the present invention is not intended to be limited to the embodiment shown but is to be accorded the widest scope consistent with the principles and features described herein.

While the foregoing has described certain embodiments and the best mode of practicing the invention, it is understood that various implementations, modifications and examples of the subject matter disclosed herein may be made. It is intended by the following claims to cover the various implementations, modifications, and variations that may fall within the scope of the subject matter described.

We claim:

1. A method of tracking a position of an object, the method comprising:
    creating at least one geofence on a map of a predefined location;
    identifying, by Wi-Fi trilateration, the position of the object within the at least one created geofence, the Wi-Fi trilateration comprising selecting the position of the object as a best location from a plurality of locations, wherein the plurality of locations is determined by a plurality of mathematical models comprising a polygon centroid method, a polygon triangle centroid method, and an expanding circles method, further wherein a first location of the plurality of locations is a centroid of a hexagon formed between a set of three Wi-Fi routers, by the polygon centroid method, whereby the set of three Wi-Fi routers are closest to the position of the object from among a plurality of Wi-Fi routers;
    creating a floor layout of the predefined location by a handheld device; and
    representing the position of the object on the created floor layout.

2. The method of claim 1, further comprising:
    retrieving a set of location co-ordinates of a boundary of a geofence of the at least one created geofence; and
    storing the set of location co-ordinates of the geofence of the at least one created geofence in a repository.

3. The method of claim 2, further comprising:
    triggering an action when the object crosses the boundary of the geofence of the at least one created geofence.

4. The method of claim 1, wherein creating a floor layout comprises:
    collecting a set of location co-ordinates of a plurality of positions within the predefined location, whereby the plurality of positions are traversed by the handheld device;

tagging a position based on a functional aspect of the position; and generating the floor layout based on the collected set of location co-ordinates and a tagging information of the plurality of positions.

5. The method of claim 4, wherein a location co-ordinate of a position comprises a latitude, a longitude and an altitude of the position.

6. The method of claim 4, wherein representing the position of the object on the floor layout comprises disclosing a proximity of the object to a tagged position of the generated floor layout.

7. The method of claim 1, wherein one or more of the at least one created geofence is associated with a point of interest.

8. The method of claim 7, further comprising:
retrieving a last point of interest of the object; and
suggesting a next point of interest of the object.

9. The method of claim 1, wherein a shape of one or more of the at least one created geofence is selected from the group consisting of: a circle, a line and a polygon.

10. The method of claim 1, wherein a second location of the plurality of locations is a centroid of an inner hexagon formed within the hexagon, via the polygon triangle centroid method.

11. The method of claim 10, wherein a third location of the plurality of locations is a centroid of a pentagon formed between the set of three Wi-Fi routers, by the expanding circles method.

12. The method of claim 1, wherein a second location of the plurality of locations is a centroid of a pentagon formed between the set of three Wi-Fi routers, by the expanding circles method.

13. A system for tracking a position of an object, the system comprising:
a drawing pad configured to create at least one geofence on a map of a predefined location;
a tracking module configured to identify a position of the object by Wi-Fi trilateration within the at least one created geofence and to track a distance of the object from a plurality of Wi-Fi routers, wherein the plurality of Wi-Fi routers is located within the predefined location, further wherein the Wi-Fi trilateration comprises selecting the position of the object as a best location from a plurality of locations determined by a plurality of mathematical models comprising a polygon centroid method, a polygon triangle centroid method, or an expanding circles method, wherein a first location of the plurality of locations is a centroid of a hexagon formed between a set of three Wi-Fi routers, by the polygon centroid method, whereby the set of three Wi-Fi routers are closest to the position of the object from among a plurality of Wi-Fi routers;
a floor map generator configured to create a floor layout of the predefined location; and
a display module, configured to represent the position of the object on the created floor layout.

14. The system of claim 13, further comprising:
a geo-point collector, configured to collect a set of location co-ordinates of a plurality of positions within the predefined location when the plurality of positions is traversed by a handheld device;
a geo-point tagging module, configured to tag a position of the predefined location, based on a functional aspect of the position; and
a floor map renderer, configured to render the created floor layout on a display module.

15. The system of claim 14, wherein the floor map generator is configured to create the floor layout based on the collected set of location co-ordinates and a tagging information of the plurality of positions.

16. The system of claim 14, wherein the display module is further configured to disclose a proximity of the object to a tagged position of the created floor layout.

17. The system of claim 13, further comprising:
an interface module, configured to retrieve a set of location co-ordinates of a boundary of a geofence of the at least one created geofence;
a repository, configured to store the created floor layout and the set of location co-ordinates of the geofence of the at least one created geofence; and
a triggering module, configured to generate an action when the object crosses the boundary of the geofence of the at least one created geofence.

18. The system of claim 13, wherein a second location of the plurality of locations is a centroid of an inner hexagon formed within the hexagon, via the polygon triangle centroid method.

19. The method of claim 18, wherein a third location of the plurality of locations is a centroid of a pentagon formed between the set of three Wi-Fi routers, by the expanding circles method.

20. The system of claim 13, wherein a second location of the plurality of locations is a centroid of a pentagon formed between a set of three Wi-Fi routers, by the expanding circles method.

21. The system of claim 13, wherein the drawing pad is further configured to associate a point of interest with one or more of the at least one created geofence.

22. The system of claim 21, wherein the tracking module is further configured to:
retrieve a last point of interest of the object; and
suggest a next point of interest of the object.

23. The system of claim 13, wherein a shape of at least one of the at least one created geofence is a circle, a line or a polygon.

24. A computer program product consisting of a plurality of program instructions stored on a non-transitory computer-readable medium that, when executed by a computing device, performs a method of tracking a position of an object; the method comprising:
creating at least one geofence on a map of a predefined location;
identifying, by Wi-Fi trilateration, the position of the object within the at least one created geofence, the Wi-Fi trilateration comprising selecting the position of the object as a best location from a plurality of locations, wherein the plurality of locations is determined by a plurality of mathematical models comprising a polygon centroid method, a polygon triangle centroid method, and an expanding circles method, further wherein a first location of the plurality of locations is a centroid of a pentagon formed between a set of three Wi-Fi routers, by the expanding circles method;
creating a floor layout of the predefined location by a handheld device; and
representing the position of the object on the created floor layout.

25. The computer program product of claim 24, wherein a second location of the plurality of locations is a centroid of a hexagon formed between the set of three Wi-Fi routers, by the polygon centroid method, whereby the set of three Wi-Fi routers are closest to the position of the object from among a plurality of Wi-Fi routers.

26. The computer program product of claim 25, wherein a third location of the plurality of locations is a centroid of an inner hexagon formed within the hexagon, via the polygon triangle centroid method.

\* \* \* \* \*